United States Patent [19]

Lewis et al.

[11] 4,447,460

[45] May 8, 1984

[54] PROCESSED VEGETABLES

[76] Inventors: Victor M. Lewis; David A. Lewis, both of 19A Boundary St., Rushcutters Bay, N.S.W., 2011, Australia

[21] Appl. No.: 315,723

[22] Filed: Oct. 28, 1981

Related U.S. Application Data

[63] Continuation-in-part of Ser. No. 165,294, Jul. 2, 1980, abandoned.

[30] Foreign Application Priority Data

Jul. 11, 1979 [AU] Australia ............................. PD 9542

[51] Int. Cl.³ .......................... A23B 7/02; A23L 1/212
[52] U.S. Cl. .................................... 426/541; 426/639; 426/640; 426/456
[58] Field of Search ............... 426/640, 639, 331, 321, 426/541, 629, 637, 456, 442, 460

[56] References Cited

U.S. PATENT DOCUMENTS

| | | |
|---|---|---|
| 1,434,837 | 11/1922 | Newby . |
| 3,281,251 | 10/1966 | Templeton ........................... 426/309 |
| 3,495,989 | 2/1970 | Lewis et al. .......................... 426/557 |
| 3,595,681 | 7/1971 | Kaplow et al. ....................... 426/331 |

FOREIGN PATENT DOCUMENTS

| | | |
|---|---|---|
| 265084 | 10/1963 | Australia . |
| 1345568 | 4/1961 | France . |
| 8-159848 | 10/1933 | Japan . |
| 136564 | 11/1963 | New Zealand . |
| 154026 | 10/1967 | New Zealand . |
| 696048 | 8/1953 | United Kingdom . |
| 946330 | 1/1964 | United Kingdom . |
| 1004522 | 9/1965 | United Kingdom ................ 426/640 |
| 1228175 | 4/1971 | United Kingdom . |
| 1466479 | 3/1977 | United Kingdom . |

OTHER PUBLICATIONS

Karel, "CRC Critical Reviews in Food Technology", pp. 364–365, (1973).
Labuza, "Proceedings of the International Meeting on Food Microbiology and Technology", Tabiano B (Parma), Italy, Apr. 20–23, 1978, pp. 95–106.
Gee et al., "Food Technology", Apr. 1977, pp. 58, 60, 62 and 64.
Kimura, "Dehydrated Food Products, Korin Zanshob", May 10, 1966, Korin Shoin.

*Primary Examiner*—Raymond N. Jones
*Assistant Examiner*—Elizabeth J. Curtin
*Attorney, Agent, or Firm*—Leon Zitver

[57] ABSTRACT

Dehydrated vegetable products having relatively high moisture content and high stability are produced by dehydrating vegetables to the extent where 20–85% of the moisture has been removed; adding to the partially dehydrated vegetables a predetermined volume of a solution containing a known quantity of at least one water activity-controlling solute, the quantity of the solution being such that it is totally absorbed by the vegetables; and the vegetables are then dehydrated to a predetermined final level of moisture and/or water activity. Highly stable vegetable products having salt contents of 3–15%, sugar contents of 0–15% and moisture contents of 6–25%, with a water activity preferably in the range of 0.45–0.85 at 20° C. can be produced.

11 Claims, No Drawings

PROCESSED VEGETABLES

This application is a continuation in part of application Ser. No. 165,294, filed July 2, 1980, now abandoned the disclosure of which is hereby incorporated by reference.

The present invention relates to a process for the dehydration of vegetables whereby pre-determined quantities of solutes are accurately incorporated into vegetables to produce dehydrated products with relatively high moisture content and high stability. In general the dehydrated products are produced having water activities between 0.45 and 0.85 at 20° C.

As is recognized in the art, water activity is a significant factor in controlling microbial growth. A discussion of water activity and its significance in this respect may be found, for instance, in Potter, "Food Science", second edition 1973, The Avi Publishing Co., Westport, Conn., at pages 147 and 289 through 293.

The dehydrated vegetables produced according to the present invention are stable and have a more rapid rehydration time, improved color, flavor and texture, higher moisture content and lower production cost than dehydrated vegetables produced by known processes.

The term "vegetables" as used herein denotes all types of vegetables including the leaves, roots, bulbs and stems thereof, and fruit.

The expression "water activity-controlling solute" includes, but is not limited to, salts (for example sodium chloride), sugars (for example sucrose, dextrose, sugar derivatives and the like), soluble protein hydrolysates, and mixtures thereof. The use of prohibited food additives is not contemplated.

Of recent years there has been a considerable increase in demand for dried packaged convenience foods such as soups, risottos and casseroles. These packaged foods normally contain dehydrated vegetables of various types, which desirably should rapidly rehydrate. For packs of good quality, it is not unusual for manufacturers to use freeze-dried vegetables. These however, are quite expensive, largely as a result of the high cost of capital equipment and high energy usage associated with their processing. They also must be maintained at a low moisture content, and if co-packed with cereals, pasta, etc., these other major ingredients must be reduced in moisture to be compatible with the dehydrated vegetables. In addition because of their need to be maintained at a low moisture content, sophisticated packaging materials must be used for their storage and distribution. A similar situation exists with conventionally hot-air dried vegetables, but these suffer additionally from slow rehydration time and poor flavour and texture.

In the normal air-drying of vegetables, approximately 75% of the moisture is removed during the first 25% of the drying time. In the final 75% of the drying time, a mere 20% of the original moisture is removed. In the final 75% of the drying time most of the flavor, texture and color loss occurs. Moreover, because of high energy input and slow throughput through capital intensive equipment such processes have proved to be expensive. With most common vegetables, maximum moisture content after dehydration is approximately 5% but good commercial practice is for the moisture content to be considerably lower and this of course prolongs the time of processing of vegetables treated in this manner.

By introducing solutes (as defined hereinbefore) into vegetables, the water activity of the dried product can be substantially reduced so that shelf-stable "intermediate moisture" dried products can be prepared. These products, when boiled with water, or when boiling water is poured on to them, rehydrate more rapidly because they start off at a higher moisture content, and also because of the presence of solutes, which induce more rapid intake of water into the vegetable tissue.

The addition of solutes to processed vegetables is not new per se. The preservation of fresh vegetables with salt has been practised for hundreds of years. More recently various methods have been published wherein salt is introduced into vegetables prior to drying by blanching the vegetables in salt solutions, or by steeping the vegetables either before or after drying in salt, sugar or other solutions. These methods have not found favor or commercial benefit because of the disadvantages encountered in employing such methods. They are awkward to use in practice. More importantly, it is very difficult to adequately control the amount of solute intake from the solutions. In order to be of practical value such a steep solution in prior art processes must be used more than once. If vegetable material is immersed in the steep solution, it absorbs solutes from the solution and simultaneously water enters the steep solution from the vegetables. Thus after a steeping process, the composition of the steep solution will have been markedly altered by immersion of the vegetables. Moreover, in a steep solution containing a mixture of dissolved substances, the proportion of the various ingredients absorbed by the vegetables will be different, leaving a residual steep solution with a different proportional composition than originally. It is well known, for instance, that salt (NaCl) is more rapidly absorbed from a solution by vegetables than is sucrose. It is quite impracticable in modern manufacturing practice, to have to analyse and replace into the steep solution those ingredients which have been absorbed from the solution, and it would be virtually impossible to control the contamination of the steep solution by soluble compounds absorbed into it from the vegetables.

Furthermore, during steeping the steep solution becomes contaminated with insoluble matter derived from the vegetables, and if it is reused, it becomes necessary to remove this debris by filtration, centrifugation etc. With hot steep solutions, starch particles derived from the vegetables (particularly from legumes and pulses) becomes gelatinized and are difficult to remove from the solution.

Using cool or warm steep solutions, microbial contamination becomes a problem, and it becomes therefore even more difficult to reuse the solutions.

Furthermore, acids and enzymes absorbed into the solution from the vegetables or fruits can act on the sugars in the solution to hydrolyse them to reducing sugars which can cause browning of the vegetables or fruit during storage.

It becomes very difficult in practice to adequately drain vegetables which have been steeped, particularly if steeped in sugar solutions. Furthermore, the free liquid adhering to the vegetable pieces after draining caused great problems during dehydration.

Our method of introducing solutes, does not utilize a steeping step. It obviates all of the difficulties referred to in the steeping method and because of its ease and simplicity, enables high speed, efficient dehydration to be achieved.

Moreover, because the additions can be made with great exactitude it allows us to control exactly the composition of additives, which is essential to the commercial production of intermediate moisture vegetables in the range of water activities which we claim.

The object of the present invention is to provide a simple, but reliable, process for the dehydration of vegetables wherein the quantity of solutes introduced into the vegetables can be controlled within very fine limits. The present invention is an advance in the art of dehydrating vegetables, as it overcomes problems, in particular the problem of controlling the amount of solute intake, associated with such processes as used hitherto.

In its broadest aspect, the present invention provides a process wherein vegetables are dehydrated to desired moisture and water activity levels comprising the steps of:

(a) partially dehydrating vegetables to the extent where the residual moisture is at least 10% and as much as 45%

(b) adding to the partially dehydrated vegetables a predetermined volume of a solution containing a known quantity of at least one water activity controlling solute, the quantity of the solution being such that it is totally absorbed by the partially dehydrated vegetables, and (c) dehydrating the vegetables to a predetermined final level of moisture and/or water activity.

The dehydrated vegetables produced by the process according to the invention are highly stable and have known solute, water activity and moisture levels. In addition the moisture level is considerably higher than those conventionally employed. They also have a more rapid rehydration time, improved color, flavor and texture when rehydrated, and a lower production cost.

The present invention will now be described with reference to preferred forms thereof. As a prelude to the ensuing description, it is specifically mentioned that all details thereof are intended to be merely illustrative of the invention.

Vegetables such as onions, carrots and cabbage are prepared for dehydration by cutting in the conventional way into slices, cubes, strips, etc. Other vegetables, such as peas, fresh lima beans and black-eyed peas, are left whole. Where desired, the vegetables may be blanched in water or steam. The vegetables are placed in the dehydrator on trays or on a continuous belt or in other such manner as is required in the proper operation of equipment.

The partially dried vegetables are removed from the dehydrator during the stage when rapid dehydration of moisture is occurring or has just occurred. The preferred stage of removal will vary from product to product and may, for example, be when as much as 10–45% of the residual moisture in the vegetable remains. This stage is selected so that the semi-driedvegetables are highly absorptive of liquids and solutes introduced into them by intimately mixing them with the pre-calculated quantity of solutes in a minimal quantity of water. The quantity of solutes is determined from a knowledge of the original solids content of the vegetables, and the predetermined composition required in the final product. Moisture contents of the vegetables can be monitored continuously with meters. Continuous weighing of the vegetable stream which may be coupled to a metering pump allows very accurate addition of the required volume of solute-containing solution.

The solute-containing solution may simply contain one solute, for example sodium chloride or it may contain a mixture of two or more solutes, for instance, sodium chloride and dextrose. In addition at this stage food additives, such as flavourings, coloring substances, seasonings, preservatives, nutritional supplements, antioxidants, etc. may optionally be added. The solute containing solution may be mixed with the vegetables in any convenient mixer such as a tumbler-mixer or a continuous paddle mixer. The added solution is totally absorbed very rapidly the more so if the vegetables are still warm from the dryer. The temperature of the solution is not critical. The solution may be at room temperature or it may be heated. Although not essential to the performance of the invention, it is preferred to allow a tempering period of from 5 to 30 minutes, in which the vegetable pieces are allowed to stand, after the solution has been absorbed before these vegetable pieces are subjected to a final drying. This allows a more uniform penetration of the solutes throughout the vegetable pieces.

The final step in dehydration may be achieved in either a conventional continuous dryer or in a bin dryer. If a bin dryer is used, it allows the more even final drying of pieces of vegetable of different sizes to a more uniform final moisture content. However, we have found that even if final rapid drying of the vegetables is achieved to the predetermined moisture content, uniform equilibration of water activity throughout the pieces occurs during storage.

We have found in practice that highly stable dried vegetable products can be produced by employing salt (sodium chloride) solutions or solutions of salt and sugar, having final salt contents in the vegetables of 3–15%, sugar contents preferably of less than 15% but which may be as high as about 17% (0% where no sugar is employed) and final moisture contents of 6–25%. The water activity of the dehydrated product should desirably be within the range of 0.45 to 0.85 at 20° C. The desirable moisture and added solutes level is determined by the purpose for which the vegetables are to be used. Many dried vegetables today are used as a garnish to add color, flavor and texture to mixed dry packaged food products. Because the quantities of vegetables used in such a mix are relatively small, the high solid solutes content in the added vegetables is in no way objectionable. Vegetables prepared in this way cook very quickly both because of their high solutes content, their high moisture content, and because the cell structure is not altered as much as when the vegetables are dried to 3 or 4% moisture content. On rehydration, they retain their crispness and have a most desirable flavor. The solutes leach out very rapidly into the cooking water or into mixed dishes in which the vegetables are used.

The following examples illustrate the process according to the present invention.

EXAMPLE 1

Mushrooms

Five kilograms of fresh mushrooms containing 7% of solids were sliced to thickness of 4 mm and loaded onto dehydrator trays. The trays were dried in a cross-flow cabinet dryer with air temperature of 70° C. until the net weight of the mushrooms was 389 g. and the moisture content 10%.

The mushrooms were removed from the dryer and tumbled with the addition of 149 ml. of saturated sodium chloride solution at ambient temperature until the solution was totally absorbed (about 3 minutes). They were then returned to the dryer and drying continued at 50° C. for a short period of time until the final net weight was 497 g.

The mushrooms then had a water content of 20%, a salt content of 9.5% and a water activity of 0.57 at 20° C.

EXAMPLE 2

Carrots

Ten kilograms of whole carrots which had previously been peeled, washed, and blanched in steam for seven minutes were found to have a total solids content of 10.2%. They were sliced into discs 3 mm in thickness and dried until the net weight was 1160 g and the moisture content 12%. They were removed from the dryer and mixed thoroughly with 338 ml. of a saturated sodium chloride solution at ambient temperature, to which had been added (1.4 g.) of sodium metabisulfite to give a final $SO_2$ content of 500 p.p.m. The solution was almost immediately absorbed by the dried carrots, and they were allowed to stand for 15 minutes. They were then returned to the dryer and dried until the net weight was 1342 g.

The finished product had a salt content of 8%, a moisture content of 16% and a water activity of 0.45 at 20° C.

EXAMPLE 3

Onions

The trimmed white onions with a solids content of 18% were sliced to a thickness of 3 mm.

Five kg. of the sliced onions were placed on dehydrator trays and dried at 70° C. to a net weight of 1125 g. by which time the moisture content was 20%.

The onion pieces were transferred to a mixer and mixed with 353 ml. of saturated sodium chloride solution at ambient temperature. The solution was absorbed by the onions in two minutes, after which they were allowed to stand for a further ten minutes. The onions were further dried at 50° C. to a net weight of 1177 g. The finished product had a moisture content of 14%, a sodium chloride content of 9.5% and a water activity of 0.45 at 20° C.

EXAMPLE 4

Green Beans

Stringless green beans were cross cut to a length of 10 mm and blanched in steam for 2½ minutes. The beans after blanching contained 10% total solids. 1095 g. of the blanched beans were dried to a net weight of 170 g. having at that time a moisture content of 36%.

The beans were removed from the dryer and tumbled with a solution made by dissolving 12 g. of salt, 0.8 g. of sodium sulphite, and 17 g. of dextrose monohydrate in 60 ml. of water at ambient temperature. The solution was absorbed by the semi-dried beans, and they were allowed to stand for 30 minutes before returning them to the dryer. They were then further dried for a short time to a final net wt. of 170 g.

The beans had a moisture content of 18% and a water activity of 0.55 at 20° C. They had excellent colour, flavour and texture.

EXAMPLE 5

Carrots

Carrots were peeled, steam blanched for 7 minutes and water cooled. They were then sliced into 3 mm slices. 2000 g of the prepared sliced carrots were then placed on a tray and dried in the dehydrator to a net weight of 435 g, representing a moisture content of 45%. The slices were removed from the dehydrator and treated with 170 ml saturated sodium chloride solution containing 2.2 g of sodium sulphite. The brine was absorbed in a few minutes, and after ten minutes the carrots were returned to the dehydrator and dried back to a moisture content of 45%. The water activity of the finished carrots was 0.78 and the salt content 10%. After 10 months storage at ambient temperature the carrots were still of excellent colour and flavour.

In the foregoing examples, the step of subjecting the partially dehydrated vegetables to the solution of the water activity-controlling solute is performed at ambient temperature. A wide temperature latitude of about 10° C. to about 55° C. may usefully be employed for this operation, although these limits are not critical.

In conclusion, it is reiterated that the foregoing description is simply illustrative of the invention, and obviously other modifications and variations of the present invention are possible in light of the above teachings. As long as the basic criteria are observed then all such matters not being critical in themselves, can vary and still be within the full intended scope of the invention.

We claim:

1. A process for dehydrating a vegetable to a desired moisture content and a water activity level at 20° C. of from 0.45 to 0.85, comprising the steps of
   (a) partially dehydrating said vegetable, allowing at least 10% residual moisture to remain;
   (b) adding to and mixing with the partially dehydrated vegetable a predetermined volume, not exceeding 34.6% by weight of the combined weights of the vegetable and solution, of an aqueous solution containing a known quantity of at least one water activity controlling solute selected from the group consisting of sodium chloride and mixtures of sodium chloride and a sugar, said solution containing no other solutes other than flavorings, coloring substances, seasonings, preservatives, salts, nutritional supplements and anti-oxidants, the quantity of said solution being such that it is totally absorbed by said partially dehydrated vegetable, and the absorption being carried out above 10° C.; and
   (c) dehydrating said vegetable to a predetermined moisture content and said water activity level in a final dehydration step, the amounts of sugar and sodium chloride in said solution being such that the sugar content of the final dehydrated vegetable is less than 15% by weight and the sodium chloride content is 3-15% by weight.

2. A process according to claim 1 wherein the vegetable is partially dehydrated in step (a) to the extent where the residual moisture is 10 to 45%.

3. A process according to claim 2 wherein the partial dehydration step (a) is terminated when rapid dehydration of the vegetable is occurring or has just occurred.

4. A process according to claim 2 wherein the vegetable is blanched in water or steam prior to the partial dehydration step (a).

5. A process according to claim 2 wherein said water activity controlling solute is sodium chloride alone.

6. A process according to claim 5 wherein the final dehydrated vegetable product contains 3–15% sodium chloride and 6–25% water.

7. A process according to claim 2 wherein sodium chloride and sugar are jointly employed as activity controlling solutes and the final dehydrated vegetable product contains 3–15% sodium chloride, less than 15% sugar and 6–25% water.

8. A process according to claim 2 wherein said solution of at least one water activity controlling solute also contains at least one additive selected from the group consisting of flavorings, coloring substances, seasonings, preservatives, nutritional supplements and antioxidants.

9. A process according to claim 5 wherein said sodium chloride solute is added in the form of a saturated aqueous solution thereof.

10. A process according to claim 2 wherein said solution is added at a temperature of about 10° C. to about 55° C.

11. A process according to claim 2 wherein said vegetable is subjected to a tempering period of from 5 to 30 minutes subsequent to the absorption of said solution and prior to said final dehydration.

* * * * *